US011125560B2

(12) United States Patent
Scafidi et al.

(10) Patent No.: US 11,125,560 B2
(45) Date of Patent: Sep. 21, 2021

(54) ROBUST METHOD FOR TUNING OF GYROSCOPE DEMODULATION PHASE

(71) Applicant: INVENSENSE, INC., San Jose, CA (US)

(72) Inventors: Pietro Scafidi, Milan (IT); Luca Coronato, Corsico (IT)

(73) Assignee: InvenSense, Inc., San Jose, CA (US)

( * ) Notice: Subject to any disclaimer, the term of this patent is extended or adjusted under 35 U.S.C. 154(b) by 5 days.

(21) Appl. No.: 16/845,559

(22) Filed: Apr. 10, 2020

(65) Prior Publication Data

US 2021/0033396 A1 Feb. 4, 2021

Related U.S. Application Data

(60) Provisional application No. 62/880,316, filed on Jul. 30, 2019.

(51) Int. Cl.
*G01C 19/5712* (2012.01)
*G01C 25/00* (2006.01)

(52) U.S. Cl.
CPC ......... *G01C 19/5712* (2013.01); *G01C 25/00* (2013.01)

(58) Field of Classification Search
CPC ... G01C 19/5712; G01C 25/00; G01C 25/005
See application file for complete search history.

(56) References Cited

U.S. PATENT DOCUMENTS

| 5,889,193 | A | * | 3/1999 | Pfaff | G01C 25/005 |
| | | | | | 73/1.37 |
| 6,062,082 | A | * | 5/2000 | Guenther | G01C 19/5712 |
| | | | | | 73/504.03 |
| 6,553,833 | B1 | * | 4/2003 | Funk | G01C 19/5712 |
| | | | | | 73/504.08 |
| 9,574,902 | B2 | * | 2/2017 | Okon | G01C 25/005 |
| 10,267,650 | B2 | | 4/2019 | Senkal | |
| 10,648,813 | B2 | | 5/2020 | Mecchia | |
| 2005/0283330 | A1 | * | 12/2005 | Laraia | G01C 25/00 |
| | | | | | 702/104 |
| 2007/0240486 | A1 | * | 10/2007 | Moore | G01C 21/16 |
| | | | | | 73/1.37 |
| 2010/0132463 | A1 | * | 6/2010 | Caminada | G01C 19/56 |
| | | | | | 73/504.12 |
| 2013/0268228 | A1 | * | 10/2013 | Opris | G01C 25/00 |
| | | | | | 702/104 |
| 2013/0269413 | A1 | * | 10/2013 | Tao | B81B 7/008 |
| | | | | | 73/1.38 |
| 2014/0373595 | A1 | * | 12/2014 | Glueck | G01C 25/005 |
| | | | | | 73/1.38 |

(Continued)

*Primary Examiner* — David J Bolduc
(74) *Attorney, Agent, or Firm* — Haley Guiliano LLP; Joshua V. Van Hoven; Stefan D. Osterbur (57) ABSTRACT

An optimal demodulation phase for extracting an in-phase component of a MEMS gyroscope output signal is determined through a test procedure. During the test procedure, multiple different rotation rate patterns such as different directions of rotation and different rotation rates are applied to the MEMS gyroscope while the MEMS gyroscope output signal is demodulated based on demodulation phases near a predicted quadrature phase for the MEMS gyroscope. The measured gyroscope outputs are used to calculate an optimal demodulation phase for the MEM gyroscope.

20 Claims, 7 Drawing Sheets

(56) References Cited

U.S. PATENT DOCUMENTS

| | | | |
|---|---|---|---|
| 2015/0057959 A1* | 2/2015 | Ezekwe | G01C 19/5776 |
| | | | 702/96 |
| 2016/0018243 A1* | 1/2016 | Okon | G01C 19/5776 |
| | | | 73/1.77 |
| 2016/0231112 A1* | 8/2016 | Stewart | G01C 19/5677 |
| 2017/0307374 A1* | 10/2017 | Hughes | G01C 19/5712 |
| 2017/0350722 A1* | 12/2017 | Senkal | G01C 19/5614 |
| 2018/0058854 A1* | 3/2018 | Suzuki | G01C 19/5726 |
| 2018/0274924 A1* | 9/2018 | Mecchia | G01C 19/5776 |
| 2018/0274941 A1 | 9/2018 | Quartiroli | |
| 2019/0120657 A1 | 4/2019 | Senkal | |
| 2019/0186950 A1 | 6/2019 | Dakshinamurthy | |
| 2020/0400433 A1* | 12/2020 | Aaltonen | G01C 19/5776 |

* cited by examiner

ROBUST METHOD FOR TUNING OF GYROSCOPE DEMODULATION PHASE

CROSS-REFERENCE TO RELATED APPLICATION

This application claims priority to commonly owned U.S. Provisional Patent Application No. 62/880,316, entitled "Robust Method for Tuning of Gyroscope Demodulation Phase" and filed Jul. 30, 2019, which is hereby incorporated by reference herein in its entirety.

BACKGROUND OF THE INVENTION

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical (MEMS) sensors such as accelerometers and gyroscopes capture complex movements and determine orientation or direction. For example, smartphones are equipped with accelerometers and gyroscopes to understand the movement of the smartphone, to augment navigation systems that rely on Global Position System (GPS) information, and to perform numerous other functions. Wearable devices and internet-of-things (IoT) devices constantly measure movement and other characteristics of a person, animal, or electronic device. In another example, drones and aircraft determines orientation based on gyroscope measurements (e.g., roll, pitch, and yaw) and vehicles of all types implement assisted driving to improve safety (e.g., to recognize skid or roll-over conditions).

MEMS sensors such as gyroscopes have manufacturing tolerances and are assembled into a variety of end-use products. The assembly into the end-use products may itself expose the sensors to different static forces and stresses. Further, during use in the field, the MEMS sensors may be exposed to additional stresses based on the particular end-use application. As a result, the micromechanical components of a MEMS device may have variations from manufacturing and/or may experience stresses during use that modify their operation, resulting in differing responses to expected measured parameters. As a result, any particular manufactured or installed MEMS device will have a number of electrical and/or mechanical components that vary from ideal or designed parameters, which may impact the device's accuracy and sensitivity. Even when these variances are within tolerances, it is desirable to optimize the MEMS device to limit any corresponding degradation in performance.

One such parameter of interest for MEMS gyroscopes is demodulation phase. A MEMS gyroscope applies a drive signal having a particular phase and frequency to drive components of a suspended spring-mass system of the MEMS gyroscope (e.g., to drive masses) to impart a drive motion on the MEMS gyroscope. Based on the design of the gyroscope, an angular velocity about an axis, when combined with the drive motion along a perpendicular axis, will result in a Coriolis force (e.g., at the drive frequency) experienced by one or more proof masses along a third axis that is perpendicular to the other two axes. The motion of the proof masses is converted into an electrical signal that is modulated at the drive frequency, which in turn is demodulated by a signal having the drive frequency. The complex motions that are experienced by the suspended spring-mass system result in the MEMS output signal due to the motion of the proof masses having an in-phase component corresponding to the sensed angular velocity and a quadrature component that is 90 degrees out of phase with the in-phase component. The phase of the MEMS output signal (e.g., based on the electromechanical propagation of the drive signal through the suspended spring-mass system) may vary based on factors such as design tolerances of the components of the suspended spring-mass system and packaging stresses. To the extent that the phase of the demodulation signal is not aligned with the in-phase component of the MEMS output signal, the magnitude of the resulting demodulated signal will not accurately reflect the sensed angular velocity and may reflect other components of the MEMS output signal such as the quadrature signal, negatively affecting the sensitivity of the MEMS gyroscope to angular velocity.

SUMMARY

In some embodiments of the present disclosure, a method for determining an optimal demodulation phase of a microelectromechanical (MEMS) gyroscope comprises setting a first demodulation phase for the gyroscope, rotating the gyroscope at a first rate of rotation, measuring a first output of the gyroscope for the first rate of rotation and the first demodulation phase, rotating the gyroscope at a second rate of rotation, and measuring a second output of the gyroscope for the second rate of rotation and the first demodulation phase. The method may further comprise setting a second demodulation phase for the gyroscope, rotating the gyroscope at the first rate of rotation, measuring a third output of the gyroscope for the first rate of rotation and the second demodulation phase, rotating the gyroscope at the second rate of rotation, and measuring a fourth output of the gyroscope for the second rate of rotation and second demodulation phase. The method may further comprise determining the optimal demodulation phase based on the first output, the second output, the third output, and the fourth output.

In some embodiments of the present disclosure, a MEMS gyroscope comprises a suspended spring-mass system comprising at least one proof mass that moves in response to a rotation of the gyroscope, at least one sense electrode located adjacent to the at least one proof mass to form a capacitor with the at least one proof mass, and processing circuitry. The processing circuitry may be configured to receive a sense signal based on the capacitance, apply a first demodulation phase to the sense signal, and measure a first output of the gyroscope for the first demodulation phase, wherein the first output corresponds to a first rate of rotation applied to the gyroscope. The processing circuitry may further be configured to measure a second output of the gyroscope for the first demodulation phase, wherein the second output corresponds to a second rate of rotation applied to the gyroscope. The processing circuitry may further be configured to apply a second demodulation phase to the sense signal, and measure a third output of the gyroscope for the second demodulation phase, wherein the third output corresponds to the first rate of rotation applied to the gyroscope, and measure a fourth output of the gyroscope for the second demodulation phase, wherein the fourth output corresponds to the second rate of rotation applied to the gyroscope. The processing circuitry may further be configured to determine an optimal demodulation phase for the gyroscope based on the first output, the second output, the third output, and the fourth output.

In some embodiments of the present disclosure, a test system for determining an optimal demodulation phase for a MEMS gyroscope comprises at least one test fixture configured to rotate the gyroscope at a first rate of rotation and to rotate the gyroscope at a second rate of rotation. The test system may further comprise processing circuitry configured to set a first demodulation phase for the gyroscope, measure a first output of the gyroscope for the first rate of rotation and the first demodulation phase, and measure a second output of the gyroscope for the second rate of rotation and the first demodulation phase. The processing circuitry may further be configured to set a second demodulation phase for the gyroscope, measure a third output of the gyroscope for the first rate of rotation and the second demodulation phase, measure a fourth output of the gyroscope for the second rate of rotation and second demodulation phase, and determine the optimal demodulation phase based on the first output, the second output, the third output, and the fourth output.

BRIEF DESCRIPTION OF DRAWINGS

The above and other features of the present disclosure, its nature and various advantages will be more apparent upon consideration of the following detailed description, taken in conjunction with the accompanying drawings in which.

DETAILED DESCRIPTION OF DRAWINGS

A MEMS gyroscope includes drive circuitry that generates an electrical drive signal that is a periodic signal having a drive frequency. The drive signal is applied to a suspended spring-mass system of the MEMS gyroscope to cause movement of one or more masses of the suspended spring-mass system, such as drive masses, for example, by applying the electrical drive signal to drive electrodes located adjacent to the drive masses. The drive signal mechanically propagates through the suspended spring-mass system in a manner such that a rotation about an axis of interest (e.g., an axis perpendicular to a drive axis of a mass of the suspended spring-mass system) causes a Coriolis force along a sense axis (e.g., an axis perpendicular to the drive axis and the axis of interest). The Coriolis force is sensed by a proof mass that moves in the direction of the Coriolis force, e.g., at the drive frequency. The movement of the proof mass is sensed, for example, by an adjacent electrode that forms a capacitor with the proof mass, the capacitance of which changes based on the movement of the proof mass.

The suspended spring-mass system also experiences a quadrature error due to movements of the components of the suspended spring-mass system. The quadrature error occurs at the same frequency as the sensed Coriolis force but is 90 degrees out of phase with the Coriolis (i.e., "in-phase") signal. Accordingly, a sense signal based on the movement of the suspended spring-mass system includes both the in-phase content corresponding to the magnitude of the sensed angular velocity and quadrature content corresponding to the quadrature error of the suspended spring-mass system. As part of the processing of the sense signal, a demodulation signal corresponding to the drive signal is applied to the sense signal to demodulate the sense signal from the drive frequency. The accuracy of the ultimate output signal of the MEMS gyroscope depends upon the alignment of the phase of the demodulation signal with the phase of the in-phase component of the sense signal. If the phase of the demodulation signal is not aligned with the in-phase component of the sense signal, not only is the output of the sense signal corresponding to a sensed angular velocity reduced, but also the quadrature signal contribution to the sense signal is increased. Existing procedures for aligning the phase of the demodulation signal with the phase of the sense signal are described, for example, in commonly owned U.S. Pat. No. 10,267,650, entitled "DEMODULATION PHASE CALIBRATION" and filed on Jun. 3, 2016; U.S. Provisional Patent Application No. 62/598,332, entitled "DEMODULATION PHASE CALIBRATION USING EXTERNAL INPUT" and filed on Dec. 13, 2017; and U.S. patent application Ser. No. 16/217,509, entitled "DEMODULATION PHASE CALIBRATION USING EXTERNAL INPUT" and filed on Dec. 12, 2018, each of which is incorporated by reference herein in its entirety.

In order to better identify a demodulation phase of the demodulation signal, one or more rotation patterns may be applied to the MEMS gyroscope. The rotation patterns may be applied at a number of times during the life cycle of the MEMS gyroscope, such as after fabrication, during integration with end-use devices, during maintenance procedures and protocols, and/or during normal operation of the MEMS gyroscope. In some instances, such as in test fixtures or procedures utilized during manufacturing or maintenance, the applied rotation pattern may be performed in a known manner such as by a test fixture. In some instances, such as during normal operation of the MEMS gyroscope, rotation patterns that occur during operation may be monitored, and testing (e.g., temporary modification of demodulation phase for testing purposes) may be temporarily applied to gather test data.

The applied rotation patterns may include variations in the direction of rotation, rate of rotation, and/or angle of rotation of the MEMS gyroscope. While the plurality of rotation patterns are applied to the MEMS gyroscope, the demodulation phase may also be varied. At each combination of rotation and demodulation phase, output values corresponding to the magnitude of the demodulated signal may be measured. For at least some of the measurements, the test demodulation phase may generally correspond to the initial quadrature phase for the MEMS gyroscope. Based on these measured values, an optimal phase corresponding to either the quadrature phase or the in-phase demodulation phase may be calculated. If the optimal quadrature phase is calculated, the optimal demodulation phase may be determined based on the 90-degree phase difference between the quadrature portion of the sense signal and the in-phase portion of the sense signal.

Figure 1:
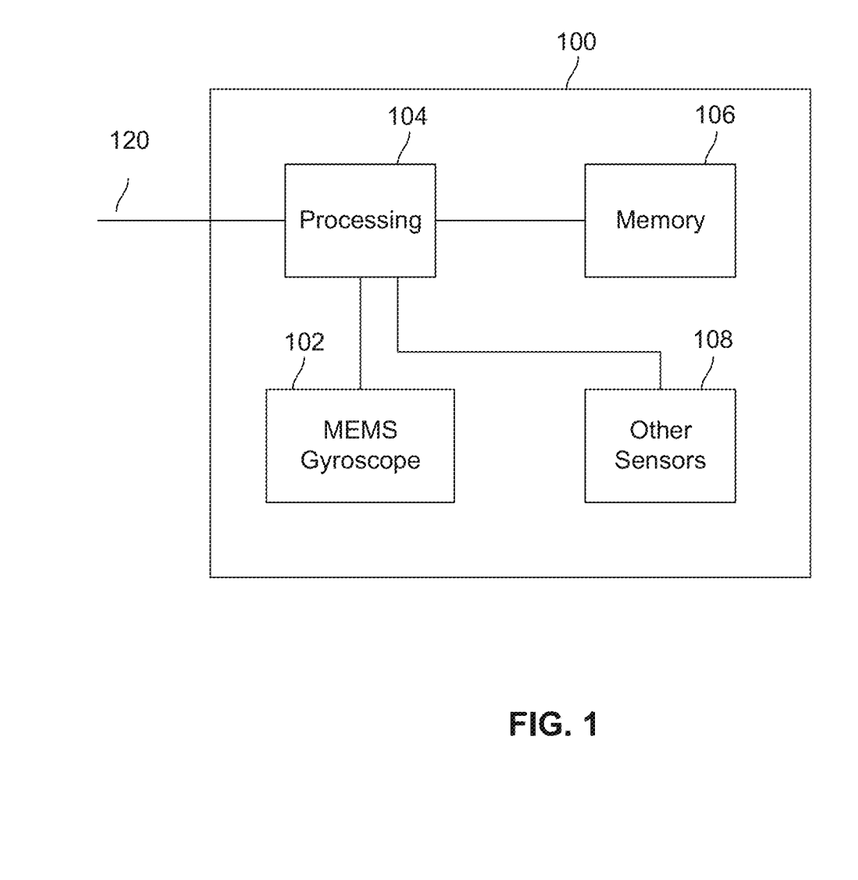
FIG. 1 depicts an exemplary motion sensing system in accordance with some embodiments of the present disclosure.

FIG. 1 depicts an exemplary motion sensing system in accordance with some embodiments of the present disclosure. Although particular components are depicted in FIG. 1, it will be understood that other suitable combinations of sensors, processing components, memory, and other circuitry may be utilized as necessary for different applications and systems. In an embodiment as described herein, the motion sensing system may include at least a MEMS gyroscope 102 (e.g., a single- or multi-axis gyroscope for measuring angular velocity about one or more axes) and supporting circuitry, such as processing circuitry 104 and memory 106. In some embodiments, one or more additional sensors 108 (e.g., MEMS gyroscopes, MEMS accelerometers, MEMS microphones, MEMS pressure sensors, and a compass) may be included within the motion processing system 100 to provide an integrated motion processing unit ("MPU") (e.g., including 3 axes of MEMS gyroscope sensing, 3 axes of MEMS accelerometer sensing, microphone, pressure sensor, and compass).

Processing circuitry 104 may include one or more components providing necessary processing based on the requirements of the motion processing system 100. In some embodiments, processing circuitry 104 may include hardware control logic that may be integrated within a chip of a sensor (e.g., on a substrate or cap of a MEMS gyroscope 102 or other sensor 108, or on a portion of a chip adjacent to the MEMS gyroscope 102 or other sensor 108) to control the operation of the MEMS gyroscope 102 or other sensors 108 and perform aspects of processing for the MEMS gyroscope 102 or other sensors 108. In some embodiments, the MEMS gyroscope 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS gyroscope 102 by interacting with the hardware control logic, and process signals received from MEMS gyroscope 102. The microprocessor may interact with other sensors in a similar manner.

Although in some embodiments (not depicted in FIG. 1), the MEMS gyroscope 102 or other sensors 108 may communicate directly with external circuitry (e.g., via a serial bus or direct connection to sensor outputs and control inputs), in an embodiment, the processing circuitry 104 may process data received from the MEMS gyroscope 102 and other sensors 108 and communicate with external components via a communication interface 120 (e.g., an SPI or I2C bus, in automotive applications a controller area network (CAN) or Local Interconnect Network (LIN) bus, or in other applications suitable wired or wireless communications interfaces as is known in the art). The processing circuitry 104 may convert signals received from the MEMS gyroscope 102 and other sensors 108 into appropriate measurement units (e.g., based on settings provided by other computing units communicating over the communication bus 120) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS gyroscope 102 or other MEMS sensors 108.

In some embodiments, certain types of information may be determined based on data from multiple MEMS gyroscopes 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

The MEMS gyroscope 102 may be tested during manufacturing of the MEMS device, integration into an end-use product, during in-field testing and maintenance procedures, and/or during use (e.g., by performing the test and optimization procedures described herein at appropriate times, such as device start-up or during portions of normal sensing). The testing may include applying rotation rate patterns (e.g., including modifying one or more of an angular velocity, a direction of rotation, and/or an angle of rotation) to the MEMS gyroscope 102. During the application of the rotation rate patterns to the MEMS gyroscope 102, a demodulation signal is applied to an output signal of the MEMS gyroscope (e.g., based on measurements from one or more proof masses of the suspended spring-mass system of the MEMS gyroscope) at a variety of demodulation phases to extract output signals. At least one of the demodulation phases corresponds to an initial quadrature phase for the MEMS gyroscope. The output signals are used to calculate a demodulation phase error for the MEMS gyroscope and to update the demodulation phase (e.g., the in-phase demodulation phase) used to extract measurements of angular velocity during operation of the MEMS gyroscope.

Figure 2:
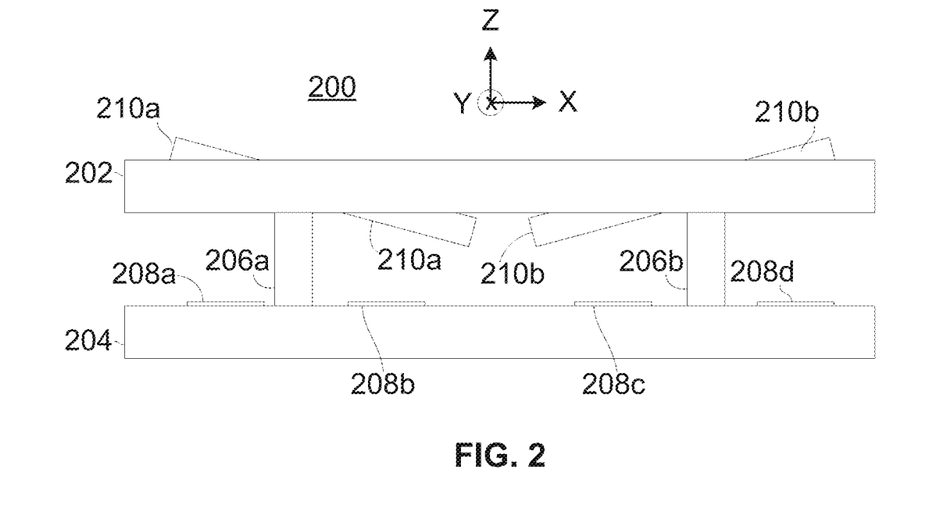
FIG. 2 shows an exemplary MEMS gyroscope in accordance with some embodiments of the present disclosure.

FIG. 2 shows an exemplary MEMS gyroscope in accordance with some embodiments of the present disclosure. The exemplary MEMS gyroscope of FIG. 2 is simplified for the purposes of illustration. It will be understood that a MEMS gyroscope as described in the present disclosure may include any suitable MEMS gyroscope design, including single-axis or multi-axis MEMS gyroscopes. Although portions of the present disclosure may be described in the context of a particular type of MEMS gyroscope configuration (e.g., a single-axis out-of-plane sensing gyroscope), it will be understood that the present disclosure may apply equally to other types and configurations.

An illustrative MEMS gyroscope 200 comprises MEMS layer 202, substrate layer 204 (e.g., a CMOS substrate layer), and anchors 206a and 206b separating the layers and located within a gap between the two layers. Packaging and additional layers (e.g., a cap layer) are not shown in FIG. 2 for ease of illustration but may be coupled to the MEMS layer 202 and/or substrate layer 204 to form a hermetically sealed cavity in which the movable MEMS components of a suspended spring-mass system (e.g., drive masses, Coriolis masses, proof masses 210a and 210b, and additional springs and/or masses coupled thereto) are able to move. The cavity may have a nominal pressure (e.g., at or near a vacuum pressure, or another suitable pressure for other particular designs). In the exemplary embodiment of FIG. 2, a bottom plane of the suspended spring-mass system of the MEMS layer 202 is located parallel to an upper plane of the substrate layer 204 and the electrodes 208a-208d located thereon.

MEMS layer 202 includes a suspended spring-mass system including proof masses 210a and 210b, which are suspended from anchors 206a and 206b, respectively, by interconnected springs and/or masses (not visible in FIG. 2). The components of the suspended spring-mass system are sized and configured in a manner to facilitate movement of the proof masses 210a and 210b in response to an inertial force to be measured, e.g., linear acceleration or angular velocity. Although not depicted in FIG. 2, drive circuitry may provide drive signals to the suspended spring-mass system. For example, in a MEMS gyroscope, a drive signal may create a physical drive motion of one or more components (e.g., drive masses, not depicted in FIG. 2) that in turn results in a Coriolis force experienced by the proof masses 210a and 210b when the gyroscope is rotated about an axis of interest. In an exemplary embodiment, the drive circuitry may provide the drive signal via one or more drive electrodes (e.g., a capacitive plate, comb electrode, etc.) located adjacent to components of the suspended spring-mass system (e.g., drive masses, etc.).

In the exemplary embodiment of FIG. 2, the proof masses are designed to move along the direction of the z-axis in response to the measured inertial force (e.g., rate of rotation or angular velocity for a gyroscope). For example, an illustrative MEMS gyroscope 200 includes a suspended spring-mass system including movable proof masses 210a and 210b, springs and additional components such as lever arms and Coriolis masses (not depicted in FIG. 2, but located within and patterned from MEMS layer 202). The springs and other movable components of the spring-mass system are coupled to the proof masses 210a/210b, and are selectively patterned and positioned such that they are relatively rigid in response to forces in directions in which it is not desired to measure the inertial force (e.g., in the embodiment of FIG. 2, in the x-axis and y-axis directions within the MEMS layer 202) and relatively flexible in a direction in which the inertial force is being measured (e.g., in the embodiment of FIG. 2, in the z-axis direction).

Proof mass 210a is suspended over electrodes 208a and 208b and proof mass 210b is suspended over electrodes 208c and 208d. In response to a z-axis movement of the proof masses due to an angular velocity experienced by a MEMS gyroscope (e.g., due to rotation of a device including a MEMS gyroscope about an axis perpendicular to the z-axis and the axis of the drive motion), the proof masses 210a and 210b rotate out of the plane of the MEMS layer (e.g., about the y-axis) such that portions of the proof mass move closer to or farther away from respective electrodes, with the degree of rotation (e.g., how much the proof masses move with respect to the respective electrodes) based on the magnitude of the angular velocity. The design of the suspended spring-mass system may be such that the proof masses 210a and 210b have minimal movement out of the MEMS plane in response to forces other than the forces being sensed.

In the exemplary embodiment of FIG. 2, the movement of the proof masses 210a and 210b out of the MEMS plane may be sensed using electrostatic sensing as depicted in FIG. 2. Fixed electrodes 208a, 208b, 208c, and 208d are located parallel to the proof masses (e.g., on substrate layer 204 below proof masses 210a and 210b) to form capacitors with portions of the proof masses (e.g., electrode 208a forms a capacitor with a first portion of proof mass 210a, electrode 208b forms a capacitor with a second portion of proof mass 210a, electrode 208c forms a capacitor with a first portion of proof mass 210b, and electrode 208d forms a capacitor with a second portion proof mass 210b). The capacitance of each of the proof masses may change based on the relative distance between each proof mass portion and its associated sense electrodes. In the embodiment of FIG. 2, the capacitances are used by processing circuitry in the substrate layer 204 to determine the inertial force. Although electrostatic sensing is described in the embodiment of FIG. 2, it will be understood that other forms of sensing (e.g., piezoelectric, infrared, or magnetic) may be used in other embodiments. While some or all of the processing circuitry may be described as located within a substrate layer 204 (e.g., a CMOS substrate layer), in some embodiments a substrate may not include active processing components, and may instead simply perform functions such as routing signals to other processing circuitry (e.g., on adjacent components to the MEMS sensor and/or stacked on layers above or below the substrate or cap of the MEMS sensor).

Figure 3:
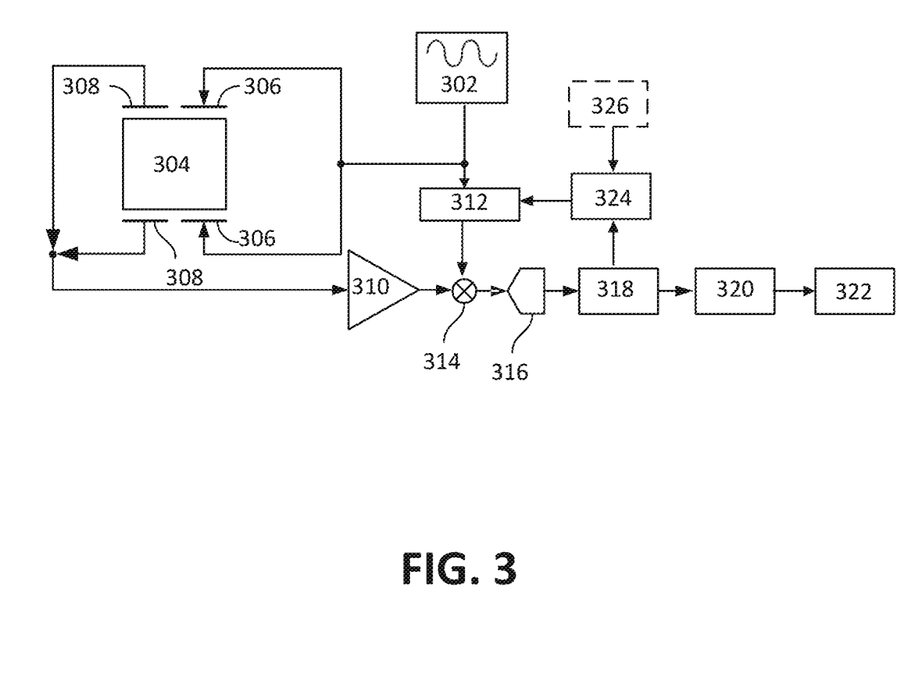
FIG. 3 depicts an exemplary MEMS gyroscope including circuitry for modifying a demodulation phase of the MEMS gyroscope in accordance with some embodiments of the present disclosure.

FIG. 3 depicts an exemplary MEMS gyroscope including circuitry for modifying a demodulation phase of the MEMS gyroscope in accordance with some embodiments of the present disclosure. Although particular components are depicted in FIG. 3 for a particular sensor, it will be understood that some of the components may be modified, removed, or replaced, and that the order of certain operations may be modified while retaining the demodulation phase monitoring and modification features described herein. In the exemplary embodiment described in FIG. 3, the sense circuitry used to determine angular velocity during normal sensor operation may be used to identify the demodulation phase during a test procedure that is initiated at appropriate times during manufacturing and assembly (e.g., during testing after fabrication of the MEMS gyroscope or assembly of the MEMS gyroscope into other circuitry or an end-use product) or in the field (e.g., by briefly modifying a demodulation phase applied to the sense circuitry of the MEMS gyroscope while a rotation that satisfies requirements for a particular direction of rotation, rate of rotation, etc., is experienced in the field). In some embodiments (not depicted in FIG. 3), portions of the MEMS gyroscope circuitry such as the delay element 312 and mixer 314 may be duplicated to permit parallel processing for determination of angular velocity (e.g., based on a current demodulation phase) and for identification of a new demodulation phase (e.g., identified as described herein).

Drive circuitry 302 may provide a periodic signal (e.g., an approximation of a sine wave) having a frequency and peak-to-peak voltage suitable for driving components such as drive masses of a suspended spring-mass system 304 of the MEMS gyroscope. The drive signal may be applied to the suspended spring-mass system via components such as drive electrodes 306 (e.g., drive plates or drive combs), which induce movement on adjacent components such as drive masses of the suspended spring-mass system 304. The movement of the drive masses propagates through the suspended spring-mass system 304 such that when a rotation occurs about an axis of interest, proof masses of the suspended spring-mass system 304 move in a particular direction (e.g., perpendicular to a drive direction and the axis of rotation) with respect to sense electrodes 308 (e.g., parallel capacitive plates with respect to the proof masses) at the drive frequency and with an amount of movement based on the angular velocity of the rotation. The suspended spring-mass system 304 also induces a quadrature error at the drive frequency, the magnitude of which is based on the particular design of the suspended spring-mass system 304. The quadrature error is also sensed by the sense electrodes 308 and is 90 degrees out of phase with respect to an in-phase component that corresponds to the sensed angular velocity.

The movement of the proof masses of the suspended spring-mass system 304 relative to the sense electrodes 308 corresponds to one or more capacitances that are measured by capacitance-to-voltage (C2V) converter 310, which converts the changing capacitance into a usable electrical signal (e.g., with a voltage and/or current that varies in proportion to the change in the capacitance between the proof masses of the suspended spring-mass system 304 and the sense electrodes 308. The resulting electrical sense signal has a frequency that corresponds to the drive signal and an in-phase component and quadrature component that are 90 degrees out of phase with respect to each other.

The output from C2V 310 is provided to mixer 314, which demodulates the electrical sense signal based on a delayed version of the drive signal received at mixer 314 from delay element 312. The propagation of the drive signal from the drive circuitry through the suspended spring-mass system 304 and associated circuitry (drive electrodes 306, sense electrodes 308, C2V 310) imparts a delay between the signal received at mixer 314 from C2V 310 and the original drive signal generated by drive circuitry 302. Delay element 312 delays the periodic drive signal from drive circuitry 302 in an attempt to align the phase of the delayed drive signal to the phase of the received sense signal from C2V 310. In view of the complex behavior of the suspended spring-mass system 304, manufacturing tolerances, packaging stresses, and other fabrication and integration effects, the actual delay required to align the phases of the received sense signal and the demodulation (e.g., delayed drive) signal may vary even between individual MEMS gyroscopes of the same design and end-use application. Moreover, the quadrature error may also vary between individual MEMS gyroscopes. Accordingly, phase misalignment between the sense signal and the demodulation signal not only reduces the in-phase content of the sense signal but also retains the quadrature content of the sense signal.

The output of the mixer 314 is provided to analog-to-digital converter 316 and decimation circuitry 318 for conversion into a suitable digital signal for further processing. The output from decimation circuitry 318 may be further processed by gain/offset/sensitivity (GOS) correction circuitry 320 to modify the baseband sense signal (e.g., to compensate for known offset or gain effects). The sense signal may then be provided as a measured angular velocity output signal to output registers 322, which signal may be further processed for providing a gyroscope output value or other output value or signal, such as identified movements and alarms.

A suitable signal of the sense circuitry (e.g., the digital output of the decimator 318, or in other embodiments, an output of other sense circuitry such as A/D converter 316, mixer 314, or GOS circuitry 320) may be provided to the demodulation test circuitry 324, which may modify the operation of delay element 312 to selectively modify the phase of the demodulation signal provided to mixer 314. As described herein, demodulation test circuitry 324 (e.g., implemented as processing circuitry of the MEMS gyroscope, for example, within a CMOS processing layer) modifies the phase of the demodulation signal (e.g., by modifying a delay applied by delay element 312), receives outputs from the MEMS gyroscope (e.g., the output of decimator 318) that correspond to particular demodulation signal phases, and repeats this process to identify an optimal demodulation phase to accurately extract the in-phase portion of the sense signal. In some embodiments, the demodulation test circuitry 324 may also communicate with test equipment 326 (e.g., a test fixture that applies rotations to a MEMS gyroscope during manufacturing), for example, to coordinate demodulation phases with test rotations applied to the MEMS gyroscope by the test equipment 326.

Figure 4:
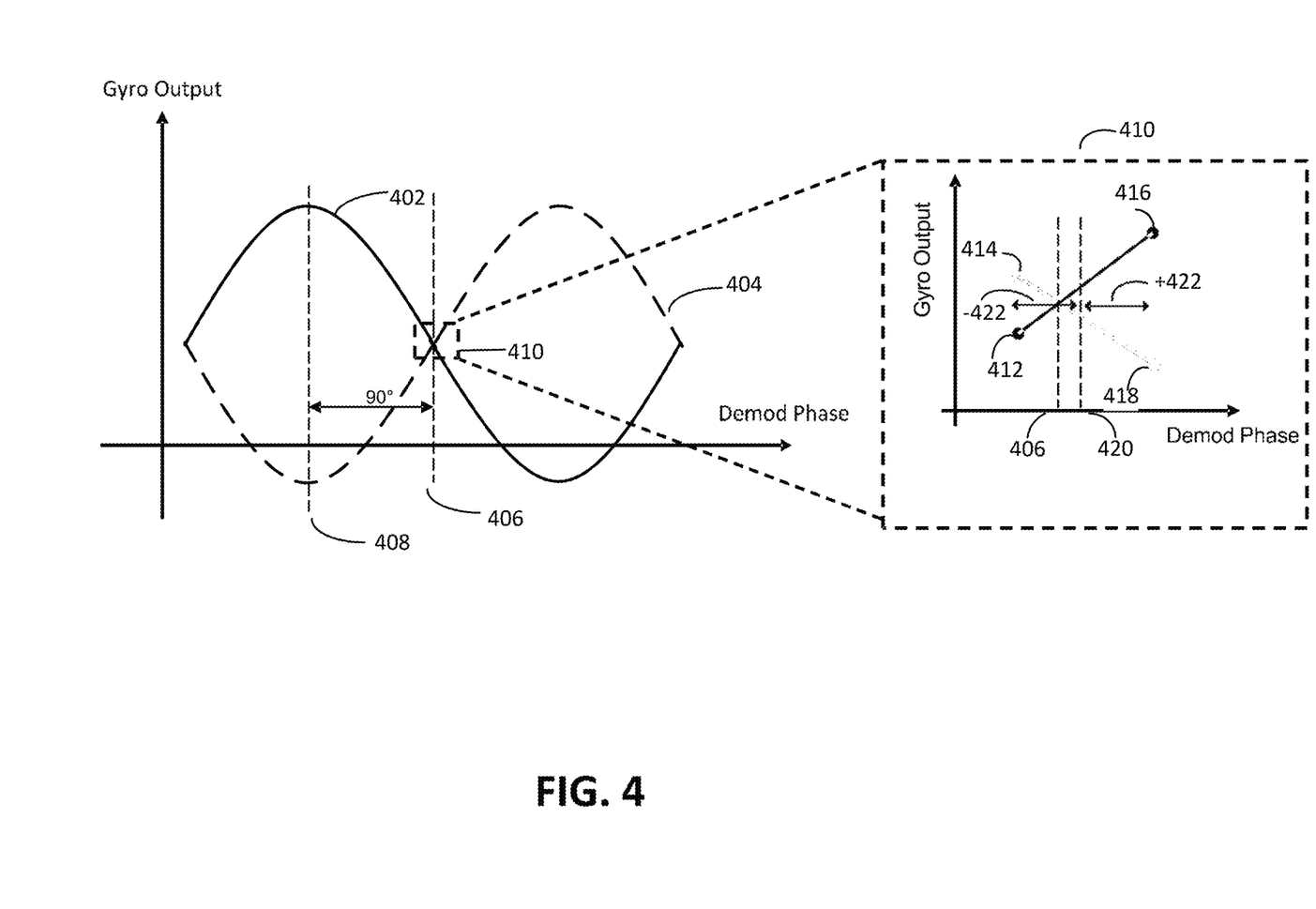
FIG. 4 depicts exemplary MEMS gyroscope outputs to a plurality of applied rotation patterns at different demodulation phases in accordance with some embodiments of the present disclosure.

FIG. 4 depicts exemplary MEMS gyroscope outputs to a plurality of applied rotation patterns at different demodulation phases in accordance with some embodiments of the present disclosure. The abscissa of FIG. 4 is depicted in units of degrees of demodulation phase, and the ordinate is a normalized gyroscope output. In the exemplary embodiment of FIG. 4, two response curves 402 and 404 are depicted for two rotation patterns. The depicted curves 402 and 404 correspond to complementary rotation patterns in the exemplary embodiment of FIG. 4, with the rotations having the same rate and opposite direction. Thus, as is depicted in FIG. 4, a peak of curve 402 corresponds to a valley of curve 404, and vice versa. It will be understood that equal and opposite rotation patterns are exemplary only, and other rotation patterns (e.g., different rates of rotation, etc.) may be applied in other embodiments.

The curves 402 and 404 intersect each other at the ideal quadrature phase 406. If the ideal quadrature phase is known and used for the demodulation signal for the MEMS gyroscope output, the output value of the MEMS gyroscope should be the same at the ideal quadrature phase 406 for either of the rotation patterns corresponding to curves 402 and 404. An ideal in-phase demodulation phase 408 is 90 degrees out of phase with the ideal quadrature phase 406, and corresponds to a maximum difference between the gyroscope output values corresponding to curves 402 and 404. As is depicted in FIG. 4, the gyroscope output curves 402 and 404 may generally correspond to a sinusoidal shape over the entire range of demodulation phase, with a zero slope at the in-phase demodulation phase 408 and a generally linear slope within a quadrature region 410 generally corresponding to the ideal quadrature phase 406 (e.g., within a suitable linear region adjacent to the ideal quadrature phase, such as within 20 degrees of the ideal quadrature phase 406). As described herein, the characteristics of the gyroscope output curves 402 and 404 within the quadrature region 410 may be used to accurately estimate the ideal quadrature phase value, and utilize that value and the known 90-degree phase difference with the in-phase demodulation phase to determine an optimized in-phase demodulation phase that accurately corresponds to the ideal in-phase demodulation phase 408.

In an exemplary embodiment, a procedure for utilizing the linear slope and intersection within the quadrature region 410 is depicted in FIG. 4. In an exemplary embodiment, an ideal quadrature phase 406 for a particular MEMS gyroscope under test is not known. However, an initial quadrature estimate 420 is believed to be relatively close to the ideal quadrature phase 406 (e.g., is located within the quadrature region 410). In order to determine the location of the intersection of the gyroscope output curves 402 and 404, and thus an accurate estimate of the ideal quadrature phase 406, a number of gyroscope outputs corresponding to different rotation patterns can be measured, such as gyroscope outputs 412, 414, 416, and 418.

In an embodiment, a first demodulation phase used to determine gyroscope outputs 412 and 414 may be selected based on the initial quadrature estimate 420 minus a phase offset 422 (e.g., −422 in FIG. 4). The output of the gyroscope may first be measured as gyroscope output 412 corresponding to the gyroscope output while undergoing the first rotation pattern (e.g., a first angular velocity in a first direction). A second output of the gyroscope may be measured as gyroscope output 414 corresponding to the gyroscope output while undergoing the second rotation pattern (e.g., the first angular velocity in the opposite direction from the first direction). These two gyroscope outputs 412 and 414 represent first points along the linear portions of the respective gyroscope output curves 402 and 404 within quadrature region 410.

In an embodiment, a second demodulation phase used to determine gyroscope outputs 416 and 418 may be selected based on the initial quadrature estimate 420 plus a phase offset 422 (e.g., +422 in FIG. 4). The output of the gyroscope may then be measured as gyroscope output 416 corresponding to the gyroscope output while undergoing the first rotation pattern (e.g., a first angular velocity in a first direction), but at the second demodulation phase. A final output of the gyroscope may be measured as gyroscope output 418 corresponding to the gyroscope output while undergoing the second rotation pattern (e.g., the first angular velocity in the opposite direction from the first direction), but at the second demodulation phase. These two gyroscope outputs 416 and 418 can be combined with their corresponding measurements at the first demodulation phase to represent portions of the respective linear portions of the gyroscope output curves 402 and 404.

Although certain selected parameters for rate of rotation, direction of rotation, phase offsets, and initial quadrature phase are depicted in FIG. 4 and described in the above discussion, it will be understood that a variety of patterns of rate of rotation as well as demodulation phase selections may be utilized to identify linear portions of the gyroscope output curves near the ideal quadrature phase in accordance with the present disclosure. For example, it is not necessary that the rotations be of equal angular velocity or that they be opposite in direction, as long as the patterns are differentiated enough that an intersection between respective curves can be identified. Further, it is not necessary to select demodulation phases having equal offsets for identification of points within the quadrature region 410. In some embodiments, demodulation phases may simply be selected in a manner adequate to identify points on both sides of the ideal quadrature phase or curve intersection. In some embodiments, as long as the values and slopes of a portion of the linear portion of the signal may be determined, it may be possible to extrapolate an intersection point corresponding to the ideal quadrature phase 406.

In this manner, a variety of rotation rate patterns and demodulation phase selections may be used to acquire samples within the linear quadrature region 410 and to accurately identify the ideal quadrature phase 406. This ability to identify the ideal quadrature phase 406 from only a limited number of movements and measurements provides significant flexibility in defining and executing test procedures. For example, only a limited set of movements are required to identify the ideal quadrature phase, and the applied angular velocity (e.g., from a test fixture that attaches to the MEMS gyroscope or a product that includes the MEMS gyroscope, or from movements that occur during sensor operation) and movement direction need only be captured briefly (e.g., enabling movement over limited angles).

Figure 5:
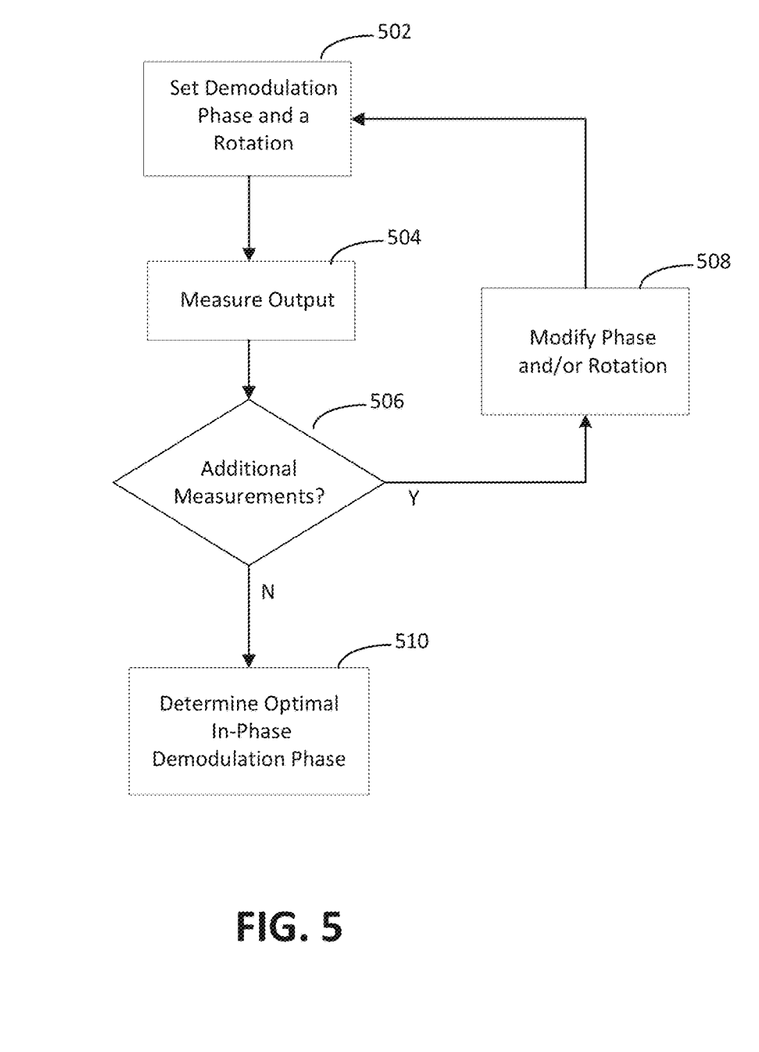
FIG. 5 depicts exemplary steps for identifying an optimal demodulation phase for a MEMS gyroscope in accordance with at least some embodiments of the present disclosure.
Figure 6:
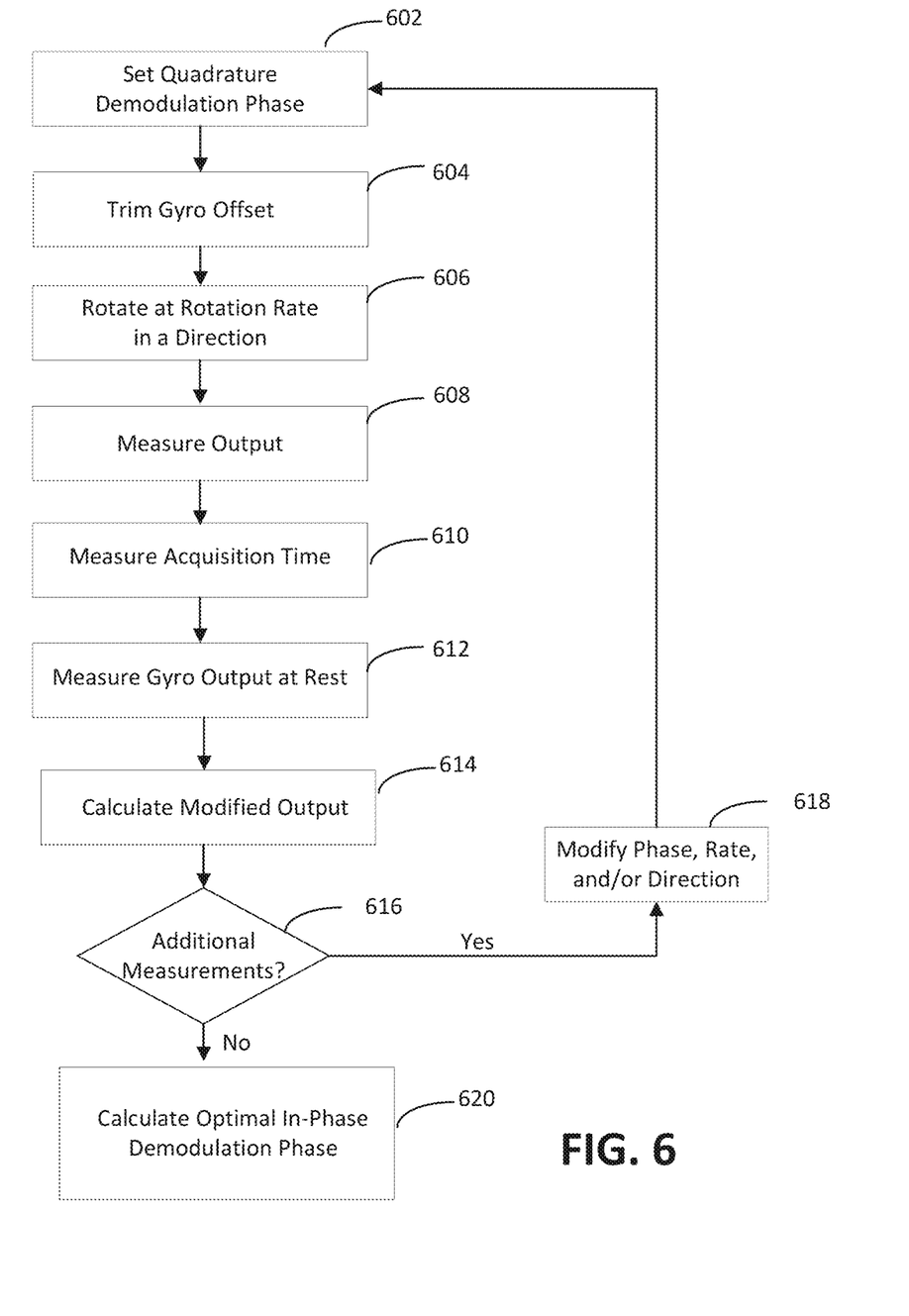
FIG. 6 depicts exemplary steps for identifying an optimal demodulation phase for a MEMS gyroscope based on multiple predicted quadrature demodulation phases in accordance with at least some embodiments of the present disclosure.
Figure 7:
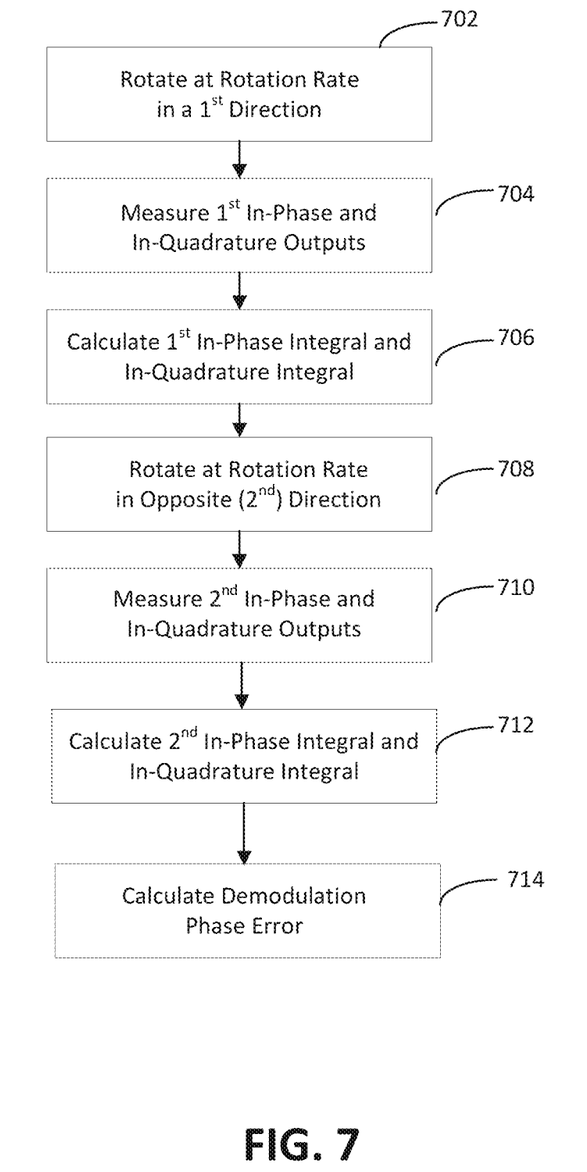
FIG. 7 depicts exemplary steps for identifying an optimal demodulation phase for a MEMS gyroscope based on in-phase demodulation phase measurement and quadrature demodulation phase measurements in accordance with at least some embodiments of the present disclosure.

FIGS. 5-7 depict exemplary steps for identifying an optimal demodulation phase in accordance with some embodiments of the present disclosure. Although FIGS. 5-7 are described in the context of the particular structures and components of the present disclosure, it will be understood that the methods and steps described in FIGS. 5-7 may be applied to a variety of MEMS gyroscope designs, compensation methods, processing circuitry, and calibration techniques. Although a particular order and flow of steps is depicted in FIGS. 5-7, it will be understood that in some embodiments one or more of the steps may be modified, moved, removed, or added, and that the flow depicted in FIG. 5-7 may be modified.

FIG. 5 depicts exemplary steps for identifying an optimal demodulation phase for a MEMS gyroscope in accordance with at least some embodiments of the present disclosure. At step 502, the MEMS gyroscope demodulation phase for measurement is set and a rotation pattern is applied. As described herein, a rate and direction of rotation may be set in a variety of manners, such as by causing a rotation of the MEMS gyroscope during manufacturing, causing rotation of an end-use product during assembly or maintenance, or monitoring for movements that satisfy the requirements of the demodulation phase setting routine (e.g., suitable rate of rotation and direction, for a suitable length of time) during normal operation. The demodulation phase may also be set, for example, by an internal test routine of the MEMS gyroscope or according to commands of a test fixture to the MEMS gyroscope. Once the rotation pattern and demodulation phase are set, processing may continue to step 504.

At step 504, a gyroscope output value may be measured for the particular rotation pattern and demodulation phase (e.g., a rate and direction of rotation, and a demodulation phase within a quadrature region) by the MEMS gyroscope. The measured value may be retained within the MEMS gyroscope and/or may be provided to external circuitry such as a test fixture. In some embodiments, the measured gyroscope output value may be associated with the respective rotation pattern and demodulation phase. Once the gyroscope output value has been measured, processing may continue to step 506.

At step 506, it may be determined (e.g., by the MEMS gyroscope and/or a test fixture) whether additional measurements are required. In some embodiments, additional measurements may be required until a suitable number of samples have been acquired to identify a point of intersection associated with the ideal quadrature phase. For example, even if a number of samples (e.g., four samples) have been acquired that may normally allow for the identification of intersecting linear portions of gyroscope output curves, in some instances one or more of the measurements may appear to be in error, it may be desired to acquire additional samples to confirm accuracy, or an iterative process may be employed to test additional demodulation phases (e.g., to test the estimate of the ideal quadrature phase, test the optimal demodulation phase, etc.). If additional measurements are required, processing may continue to step 508. If additional measurements are not required, processing may continue to step 510.

At step 508, one or both of the demodulation phase or the rotation pattern (e.g., rate, angle of rotation, direction, etc.) may be modified before collecting additional measurements. In some embodiments, modifications may be selected such that particular rotation patterns and/or demodulation phases are complementary, while in other embodiments, rotation patterns and demodulation phases may capture different portions of respective gyroscope output curves. Once the demodulation phase and/or rotation pattern is updated, processing may return to step 502.

At step 510, the MEMS gyroscope and/or test fixture (e.g., processing circuitry of the MEMS gyroscope and/or test fixture) may determine an optimal demodulation phase. Although this optimal demodulation phase may be determined in a variety of manners, in an exemplary embodiment the optimal demodulation phase may be selected as a 90-degree phase shift from an estimate of an ideal quadrature phase. The estimate of the ideal quadrature phase may be determined as the intersection of respective gyroscope output curves within a linear region such as a quadrature region. Once the optimal demodulation phase is determined, the value may be stored for use in demodulating the output sense signal of the MEMS gyroscope, and the processing of FIG. 5 may end until the next demodulation phase test procedure.

FIG. 6 depicts exemplary steps for identifying an optimal demodulation phase for a MEMS gyroscope based on multiple predicted quadrature demodulation phases in accordance with at least some embodiments of the present disclosure. At step 602 an estimated demodulation phase that is associated with a quadrature phase may be set. In an exemplary embodiment, the gyroscope may have an initial in-phase demodulation phase and a corresponding (e.g., offset by 90 degrees) initial quadrature demodulation phase. As is described herein, measurements of gyroscope output may be obtained at multiple demodulation phases that are located within a quadrature region. For example, a "delta" value may represent an offset from the initial quadrature demodulation phase, and measurements of gyroscope output may be obtained at the initial quadrature demodulation phase plus and minus the delta value. These values (e.g., an initial quadrature demodulation phase equal to the initial in-phase demodulation phase plus 90 degrees, and in an embodiment, a delta value such as +/−5 degrees) may provide a suitable range of demodulation phases to capture the ideal demodulation frequency while remaining within the linear region of the gyroscope output curves. Once an initial quadrature demodulation phase (e.g., the initial quadrature phase plus the delta value) is set, processing may continue to step 604.

At step 604, one or more gyroscope offsets may be trimmed. The gyroscope offsets may correspond to known modification factors used to modify the gyroscope output, and may include fixed (e.g., static) factors or dynamic scaling factors or filters. The offset may be trimmed in a suitable manner, such as setting a constant value to be algebraically added to the measured output such that the resulting value will be zero, when no angular rate is applied. In some embodiments (e.g., when there is a high confidence that gyroscope test outputs are measured within the linear quadrature region and/or when the offsets are small relative to the applied rotations of the test procedure), step 604 may be skipped. In any event, whether or not the offsets are trimmed, processing may continue to step 606.

At step 606, a particular first rotation pattern is applied to the MEMS gyroscope. Rotation patterns may include particular values for angular velocity (i.e., rate of rotation), angle of rotation, and direction of rotation. In some embodiments, the angle of rotation need be only enough to acquire stable samples of the sensed rate of rotation in the direction of the rotation pattern. As described herein, a variety of rotation patterns may be applied to the MEMS gyroscope. For example, in the embodiment described with respect to FIG. 6, the rotation pattern may be two rotations at an equal rotation rate and in opposite directions about the axis of rotation, with samples acquired at each demodulation phase (i.e., the rotation pattern is executed once for each demodulation phase to acquire four total samples). However, a variety of different rotation patterns may be utilized to identify the intersection point, as described herein. For example, different rotation patterns may be applied for the different demodulation phases, more or less than four samples can be acquired, and acquisition and testing may be performed iteratively with different values.

As any particular rotation is performed at step 606, the gyroscope output may be measured at step 608. In some embodiments, the acquisition time for the measurement may also be measured during the rotation at step 610. This optional acquisition time measurement may be utilized with a measurement of the gyroscope output at rest after the application of the rotation rate (step 612) to account for the gyroscope offset variation that has occurred during the device rotation due to the fact that stress conditions of the device are changing during the rotation. For example, the gyroscope output at rest (e.g., without an external acceleration applied, but with the drive signal driving portions of the suspended spring-mass system) with a demodulation phase within the quadrature region may provide information about the quadrature baseline for the sensor without coupling of forces from an applied angular velocity. Processing may then continue to step 614.

At step 614, the modified gyroscope output may be calculated (e.g., in embodiments where step 610 and 614 are not skipped). In an exemplary embodiment, a value representative of this baseline corresponds to an integral of a linear ramp of the gyroscope output during the acquisition time, going from zero to the gyroscope output at rest. If the integral of the gyroscope output while the rotation is applied is represented by (Gyro_Rot), the gyroscope output at rest is represented by (Quad_Rest) and the acquisition time by (Acq_Time), the modified integral of the gyroscope output (Gyro_Out) used to determine the optimized in-phase demodulation phase may be calculated, for example, according to the following: Gyro_Out=Gyro_Rot−Quad_Rest*Acq_Time/2. Once the gyroscope output for use in calculating the in-phase demodulation phase is obtained or calculated, processing may continue to step 616.

At step 616, it may be determined whether additional measurements are to be taken, i.e., utilizing different rotation patterns and/or demodulation phases. If so, processing may continue to step 618, at which the parameters for the measurement are adjusted and the processing of steps 602-614 is repeated until a complete set of measurements is obtained. In an exemplary embodiment corresponding to the demodulation phases and rotation patterns depicted in FIG. 4, a first measurement 412 at demodulation phase 420 minus 422 may correspond to a rotation at a first rate and in a first direction (e.g., a positive rotation about an axis at a first rate of rotation). A second measurement 414 may be taken at the demodulation phase 420 minus 422 (i.e., the demodulation phase may be maintained at the same value) and the rotation may be reproduced at the same rate and in the opposite direction. The demodulation phase may then be adjusted to 420 plus 422, and the rotation rate and direction used to obtain gyroscope output 412 may be repeated to obtain a third measurement 416. Finally, the fourth measurement 418 may be taken at the second demodulation phase (420 plus 422) and at the rotation rate and direction used to obtain second measurement 414. Once a suitable number of measurements has been captured, processing may continue to step 620.

At step 620, the optimal demodulation phase may be calculated from the measurements. Depending upon the quantity, precision, relative output values, and respective demodulation phases, a number of approaches may be used to estimate an ideal quadrature phase value (e.g., corresponding to a point of intersection of two gyroscope output curves within a quadrature region), which may then be used to determine the optimal demodulation phase (e.g., based on a 90-degree phase shift). In an exemplary embodiment of four measurements corresponding to an equal-and-opposite rotation pattern with two equally spaced respective demodulation phases as depicted in FIG. 4, an estimate of the ideal quadrature phase may be determined according to the following:

$$Q\_Phase=(Output_{DP1\text{-}Neg}-Output_{DP1\text{-}Pos})/(s1-s2)+Quad\_Init-Phase\_Offset$$

where:
Q_Phase=Estimate of ideal quadrature phase;
$Output_{DP1\text{-}Neg}$=Output at the $1^{st}$ Demodulation Phase and negative direction of rotation;
$Output_{DP1\text{-}Pos}$=Output at the $1^{st}$ Demodulation Phase and positive direction of rotation;
s1=$(Output_{DP2\text{-}Pos}-Output_{DP1\text{-}Pos})$/Phase_Offset*2;
s2=$(Output_{DP2\text{-}Neg}-Output_{DP1\text{-}Neg})$/Phase_Offset*2;
$Output_{DP2\text{-}Neg}$=Output at the $2^{nd}$ Demodulation Phase and negative direction of rotation;
$Output_{DP2\text{-}Pos}$=Output at the $2^{nd}$ Demodulation Phase and positive direction of rotation;
Quad_Init=Initial quadrature phase; and
Phase_Offset=Phase_offset (plus or minus) from Quad_Init Once the estimate of the ideal quadrature phase is determined, the optimal demodulation phase may be determined based on a 90-degree phase shift from Q_Phase. In the exemplary embodiment of FIG. 4, the above variables may correspond as follows: Q_Phase=ideal quadrature phase 406; $Output_{DP1\text{-}Neg}$=gyroscope output value 414; $Output_{DP1\text{-}Pos}$=gyroscope output value 412; $Output_{DP2\text{-}Neg}$=gyroscope output value 418; $Output_{DP2\text{-}Pos}$=gyroscope output value 416; Quad_Init=initial quadrature phase 420; and Phase_Offset=phase offset 422.

FIG. 7 depicts exemplary steps for identifying an optimal demodulation phase for a MEMS gyroscope based on in-phase demodulation phase measurement and quadrature demodulation phase measurements in accordance with at least some embodiments of the present disclosure. As described herein, it may be possible to utilize a variety of demodulation phases and rotation patterns in order to identify an optimized in-phase demodulation phase in accordance with the present disclosure. In the exemplary embodiment of FIG. 7, one such set of rotation patterns and demodulation phases may utilize both a nominal (e.g., initial) in-phase demodulation phase and a nominal (e.g., initial) quadrature demodulation phase and the associated gyroscope output values to calculate a phase error for the nominal in-phase value and, from that phase error, determine the optimized in-phase demodulation phase.

At step 702, the MEMS gyroscope may be rotated according to a first rotation pattern, for example at a predetermined rate of rotation about an axis in a first direction over an angle of rotation. Processing may then continue to step 704, at which gyroscope output values corresponding to both the nominal in-phase demodulation phase and the nominal quadrature demodulation phase are acquired for the first rotation pattern. The respective gyroscope output values may be obtained in a variety of manners, for example, by repeating the first rotation pattern, modifying the demodulation phase during the first rotation pattern, or providing multiple signal paths to apply the nominal in-phase demodulation phase and nominal quadrature demodulation phase simultaneously. Once the measured values for the first rotation pattern are acquired over at least a suitable portion of the rotation angle, processing may continue to step 706.

At step 706, the measured values may be integrated over the respective rotation times. The respective integrated output values for the nominal in-phase demodulation phase and nominal quadrature phase may be related to underlying signals as follows:

$$MV_{IP\text{-}POS}=(I+S)\cos\varphi+(Q+Qc)\sin\varphi, \text{ and}$$

$$MV_{QP\text{-}POS}=(Q+Qc)\cos\varphi-(I+S)\sin\varphi, \text{ and where:}$$

$MV_{IP\_POS}$=integrated measured value for nominal in-phase demodulation phase and first (positive) rotation pattern;
$MV_{QP\_POS}$=integrated measured value for nominal quadrature demodulation phase and first (positive) rotation pattern;
$\varphi$=Demodulation phase error;
I=Integral of constant in-phase offset of gyroscope during rotation;
S=Integral of gyroscope Coriolis signal during rotation;
Q=Integral of initial quadrature signal value during rotation; and
Qc=Integral of quadrature signal change during rotation.

At step 708, the MEMS gyroscope may be rotated according to a second rotation pattern, for example at the predetermined rate of rotation about the same axis as the first rotation pattern and over the same angle of rotation, but in the opposite direction from the first direction. Processing may then continue to step 710, at which gyroscope output values corresponding to both the nominal in-phase demodulation phase and the nominal quadrature demodulation phase are acquired for the second rotation pattern. The respective gyroscope output values may be obtained in a variety of manners, for example, by repeating the second rotation pattern, modifying the demodulation phase during the second rotation pattern, or providing multiple signal paths to apply the nominal in-phase demodulation phase and nominal quadrature demodulation phase simultaneously. Once the measured values for the first rotation pattern are acquired over at least a suitable portion of the rotation angle, processing may continue to step 712.

At step 712, the measured values may be integrated over the respective rotation times. The respective integrated output values for the nominal in-phase demodulation phase and nominal quadrature phase may be related to underlying signals as follows (i.e., with the sign of the "S" term related to the Coriolis signal during rotation changed):

$$MV_{IP\text{-}NEG}=(I-S)\cos\varphi+(Q+Qc)\sin\varphi, \text{ and}$$

$$MV_{QP\text{-}NEG}=(Q+Qc)\cos\varphi-(I-S)\sin\varphi, \text{ and where:}$$

$MV_{IP\text{-}NEG}$=integrated measured value for nominal in-phase demodulation phase and second (negative) rotation pattern;
$MV_{QP\text{-}NEG}$=integrated measured value for nominal quadrature demodulation phase and second (negative) rotation pattern;
$\varphi$=Demodulation phase error;
I=Integral of constant in-phase offset of gyroscope during rotation;
S=Integral of gyroscope Coriolis signal during rotation;
Q=Integral of initial quadrature signal value during rotation; and
Qc=Integral of quadrature signal change during rotation.

At step 714, based on the equations above and the respective measured values, the terms of these equations may be simplified to determine the demodulation phase error (φ) as follows:

$$\varphi = \arctan((MV_{QP\text{-}NEG} - MV_{QP\text{-}POS})/(MV_{IP\text{-}POS} - MV_{IP\text{-}NEG}))$$

The nominal in-phase demodulation phase may then be adjusted by the demodulation error to set the optimal demodulation phase for the MEMS gyroscope. The processing of FIG. 7 may then end.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method for determining an optimal demodulation phase of a microelectromechanical (MEMS) gyroscope, comprising:
    setting a first demodulation phase for the gyroscope;
    rotating the gyroscope at a first rate of rotation;
    measuring a first output of the gyroscope for the first rate of rotation and the first demodulation phase;
    rotating the gyroscope at a second rate of rotation;
    measuring a second output of the gyroscope for the second rate of rotation and the first demodulation phase;
    setting a second demodulation phase for the gyroscope;
    rotating the gyroscope at the first rate of rotation;
    measuring a third output of the gyroscope for the first rate of rotation and the second demodulation phase;
    rotating the gyroscope at the second rate of rotation;
    measuring a fourth output of the gyroscope for the second rate of rotation and second demodulation phase; and
    determining the optimal demodulation phase based on the first output, the second output, the third output, and the fourth output.

2. The method of claim 1, further comprising trimming the offset of the gyroscope prior to rotating the gyroscope.

3. The method of claim 1, wherein determining the optimal demodulation phase comprises:
    modifying each of the first output, the second output, the third output, and the fourth output based on a respective acquisition time for the acquisition for the respective output; and
    determining the optimal demodulation phase based on the modified first output, modified second output, modified third output, and modified fourth output.

4. The method of claim 1, wherein determining the optimal demodulation phase comprises:
    identifying a first linear relationship based on the first output, the first demodulation phase, the third output, and the second demodulation phase;
    identifying a second linear relationship based on the second output, the first demodulation phase, the fourth output, and the second demodulation phase; and
    determining the optimal demodulation phase based on the first linear relationship and the second linear relationship.

5. The method of claim 4, wherein determining the optimal demodulation phase based on the first linear relationship and the second linear relationship comprises identifying a point of intersection from the first linear relationship and the second linear relationship.

6. The method of claim 1, wherein the first demodulation phase is based on subtraction of a first predetermined phase offset from an initial demodulation phase, and wherein the second demodulation phase is based on an addition of a second predetermined phase offset to the initial demodulation phase.

7. The method of claim 6, wherein the first predetermined phase offset and the second predetermined phase offset are the same.

8. The method of claim 1, wherein determining the optimal demodulation phase comprises:
    determining an optimal quadrature phase based on the first output, the second output, the third output, and the fourth output; and
    subtracting ninety degrees from the optimal quadrature phase to determine the optimal demodulation phase.

9. The method of claim 1, further comprising:
    determining, prior to and after rotating the gyroscope, one or more stationary outputs of the gyroscope; and
    modifying, prior to determining the optimal demodulation phase, each of the first output, second output, third output, and fourth output based on the one or more stationary outputs.

10. The method of claim 1, wherein the rotation at the first rate of rotation and the first demodulation phase comprises a first rotation angle, the rotation at the second rate of rotation and the first demodulation phase comprises a second rotation angle, the rotation at the first rate of rotation and the second demodulation phase comprises a third rotation angle, and the rotation at the second rate of rotation and the second demodulation phase comprises a fourth rotation angle.

11. The method of claim 10, wherein the first rotation angle, second rotation angle, third rotation angle, and fourth rotation angle are equal.

12. The method of claim 10, wherein the first rate of rotation is zero, and wherein the first rotation angle and the second rotation angle are zero.

13. The method of claim 10, wherein the first rotation angle and the third rotation angle are equal, and the second rotation angle and fourth rotation angle are equal and different from the first rotation angle and third rotation angle.

14. The method of claim 1, wherein the first output and second output correspond to a first demodulation measurement path and the third output and fourth output correspond to a second demodulation measurement path, and wherein the first output and third output are measured simultaneously and the second output and fourth output are measured simultaneously.

15. The method of claim 1, further comprising:
    monitoring a rate of rotation of the gyroscope during operation;
    identifying a plurality of first time periods corresponding to the first rate of rotation;
    identifying a plurality of second time periods corresponding to the second rate of rotation;
    applying the first demodulation phase during at least one of the first time periods and at least one of the second time periods to measure the first output and the third output; and
    applying the second demodulation phase during at least one of the first time periods and at least one of the second time periods to measure the second output and the fourth output.

16. A microelectromechanical (MEMS) gyroscope, comprising:
- a suspended spring-mass system comprising at least one proof mass that moves in response to a rotation of the gyroscope;
- at least one sense electrode located adjacent to the at least one proof mass to form a capacitor with the at least one proof mass;
- processing circuitry configured to:
  - receive a sense signal based on the capacitance;
  - apply a first demodulation phase to the sense signal;
  - measure a first output of the gyroscope for the first demodulation phase, wherein the first output corresponds to a first rate of rotation applied to the gyroscope;
  - measure a second output of the gyroscope for the first demodulation phase, wherein the second output corresponds to a second rate of rotation applied to the gyroscope;
  - apply a second demodulation phase to the sense signal;
  - measure a third output of the gyroscope for the second demodulation phase, wherein the fourth output corresponds to the first rate of rotation applied to the gyroscope;
  - measure a fourth output of the gyroscope for the second demodulation phase, wherein the fourth output corresponds to the second rate of rotation applied to the gyroscope; and
  - determine an optimal demodulation phase for the gyroscope based on the first output, the second output, the third output, and the fourth output.

17. The MEMS gyroscope of claim 16, wherein, to determine the optimal demodulation phase, the processing circuitry is configured to:
- identify a first linear relationship based on the first output, the first demodulation phase, the third output, and the second demodulation phase;
- identify a second linear relationship based on the second output, the first demodulation phase, the fourth output, and the second demodulation phase; and
- determine the optimal demodulation phase based on the first linear relationship and the second linear relationship.

18. The MEMS gyroscope of claim 16, wherein, to determine the optimal demodulation phase based on the first linear relationship and the second linear relationship, the processing circuitry is configured to identify a point of intersection from the first linear relationship and the second linear relationship.

19. The MEMS gyroscope of claim 16, wherein, to determine the optimal demodulation phase, the processing circuitry is configured to:
- determine an optimal quadrature phase based on the first output, the second output, the third output, and the fourth output; and
- subtract ninety degrees from the optimal quadrature phase to determine the optimal demodulation phase.

20. A test system for determining an optimal demodulation phase for a microelectromechanical (MEMS) gyroscope, comprising:
- at least one test fixture configured to:
  - rotate the gyroscope at a first rate of rotation; and
  - rotate the gyroscope at a second rate of rotation; and
- processing circuitry configured to:
  - set a first demodulation phase for the gyroscope;
  - measure a first output of the gyroscope for the first rate of rotation and the first demodulation phase;
  - measure a second output of the gyroscope for the second rate of rotation and the first demodulation phase;
  - set a second demodulation phase for the gyroscope;
  - measure a third output of the gyroscope for the first rate of rotation and the second demodulation phase;
  - measure a fourth output of the gyroscope for the second rate of rotation and second demodulation phase; and
  - determine the optimal demodulation phase based on the first output, the second output, the third output, and the fourth output.

* * * * *